United States Patent Office 3,158,645
Patented Nov. 24, 1964

3,158,645
2,3,6-TRICHLOROBENZYL-2,4-DICHLORO-PHENOXY-ACETATE
Jack S. Newcomer, Wilson, Edward D. Weil, Lewiston, Edwin Dorfman, Grand Island, and Jerome Linder, Niagara Falls, N.Y., assignors to Hooker Chemical Corporation, Niagara Falls, N.Y., a corporation of New York
No Drawing. Original application Feb. 13, 1958, Ser. No. 714,951. Divided and this application Apr. 12, 1962, Ser. No. 186,844
1 Claim. (Cl. 260—473)

This invention relates to compositions of matter known as ring chlorinated benzyl esters.

The present invention resides in the concept of a specific position isomer of such class of substances identified by their molecular structure as 2,3,6-trichlorobenzyl esters. The physical embodiment of this concept has unique properties as a plant growth regulant and herbicide not logically predictable from the established plant regulating properties of the known herbicides and plant growth regulants of the prior art.

There are many types of herbicides in use today which suffer from high production costs, high rates of application needed, short periods of action and difficulty of avoiding damage to desirable plants. The compounds 2,4-dichlorophenoxyacetic acid and 2,3,6-trichlorobenzoic acid have been used as herbicides, but suffer from shortcomings not present in the compounds of this invention. 2,4-dichlorophenoxyacetic acid can be used as a pre-emergence herbicide only with great danger of damage to standing crops in or near the area of treatment. Further, the pre-emergence effect is short-lived because of microbial destruction of the compound in the soil. The use of 2,3,6-trichlorobenzoic acid, salts, and certain esters as a herbicide also has its drawbacks. 2,3,6-trichlorobenzoic acid, salts, and esters have post-emergence activity of such a high order that application of said compounds to the area to be treated endangers desirable vegetation in the surrounding areas. This is true because of the spray drift and volatility of this particular herbicide. 2,3,6-trichlorobenzoic acid and derivatives exert per se hormonal effects on most plant species, that is to say they are capable of effecting growth regulating properties at extremely low levels of concentration. The compounds of this invention are not hormonal per se but require that they be converted to hormonal agents through hydrolysis and/or oxidation in the soil or plant tissue. As a result of this desirable property, the compounds of this invention do not produce detrimental growth regulating effects upon contact with foliage at low levels of concentration, and the danger of damage due to volatility or spray drift is therefore negligible. In using the compounds of this invention as a herbicide, it is possible to treat the soil of an area without destruction of established desirable vegetation of certain species and yet prevent the future emergence of weeds.

The compounds of our invention are new compositions of matter and are prepared by esterification of 2,3,6-trichlorobenzyl alcohol, or by reaction of 2,3,6-trichlorobenzyl halides with a salt of the appropriate acid, or by transesterification. For commercial applications it may be advantageous to use the easily obtained crude 2,3,6-trichlorobenzyl chloride or 2,3,6-trichlorobenzyl alcohol which is contaminated with 2,4,5- and 2,3,4-trichlorobenzyl chloride or alcohol. We have found that the isomeric products other than the 2,3,6-isomer act essentially as inert contaminants, although in some cases slight synergism or antagonism may be observed.

It is an object of our invention to make available a series of compositions and methods for using said compositions which allow effective pre-emergence control of weeds with much less danger to standing crops and with longer duration of effectiveness than hitherto usual. It is a further object of our invention to provide compositions of general utility as herbicides and plant growth regulators.

The objects of our invention are achieved by treating the area to be kept free of weeds with a composition containing as an active ingredients a 2,3,6-trichlorobenzyl ester.

As examples of compounds which have been found suitable for the purposes of this invention may be mentioned 2,3,6-trichlorobenzyl formate, acetate, propionate, butyrate, isobutyrate, valerate, caproate, caprylate, ethylhexoate, laurate, acrylate, linoleate, cyclohexanecarboxylate, abietate, naphthenate, oxalate (mono- and di-ester), succinate (mono- and di-ester), adipate (mono- and diester), phenylacetate, chloroacetate, dichloroacetate, trichloroacetate, $\alpha,\alpha$-dichloropropionate, glycolate, glycinate, benzoate, dichlorobenzoate, trichlorobenzoate, tetrachlorobenzoate, phthalate (mono and diesters), dichlorophthalate, tetrachlorophthalate, 2,4-dichlorophenoxyacetate, 2,4,5-trichlorophenoxyacetate, furoate, indoleacetate, carbamate, N-alkyl carbamate, N,N-dialkyl carbamate, N-arylcarbamate; further, may be mentioned the esters with inorganic acids, as for example 2,3,6-trichlorobenzyl sulfate (mono- and diesters), phosphate (mono-, di-, and triesters), bromide, chloride, phosphorochloridate, phosphonate, phosphite, sulfite, sulfide, carbonate, thiocarbonate, dithiocarbonate, trithiocarbonate, xanthate, dithiocarbamate, thiocarbamate, or thiocyanate.

The foregoing list is given by way of illustration only, and as the examples will indicate, a great variety of alkane-, alkene-, alkyne carboxylic acids, cycloaliphatic carboxylic acids, aromatic carboxylic acids, and inorganic acids may be esterified to produce the herbicidally active 2,3,6-trichlorobenzyl esters of our invention.

The esters of the invention, while all possessing some degree of activity, are not interchangeable, and the particular ester preferred in any given case will depend on such factors as soil type, climatic conditions, plant species involved, formulation considerations and economic factors. For example, the mono-esters of dibasic acids or the salts of these esters are preferred when rapid leaching of the herbicide into the subsurface zone of the soil is desired, in order to control weeds germinating in this zone or in order to reach roots in this zone. On the other hand, the esters of higher molecular weight fatty acids or naphthenic acids are preferred where duration of activity is of greater importance than high initial activity or under conditions of high rainfall where leaching from the soil is to be avoided. Where control of grasses is to be enhanced, the 2,3,6-trichlorobenzyl ester of an acid such as trichloroacetic acid, said acid itself possessing a significant degree of herbicidal activity toward grasses, is advantageous.

These esters may be used in the pure form, but are advantageously formulated with adjuvants such as organic advents, emulsifiers, plus water, or solid carrier such as clay, talc, carbon, or the like, which may contain suspending and wetting agents. In the case of the mono-2,3,6-trichlorobenzyl esters of dicarboxylic acids, they may be dissolved in water in the form of their sodium, potassium, ammonium, or N-substituted ammonium salts, this being of practical advantage. Advantageously, we find the majority of the compounds of our invention may be dissolved in an organic solvent of the aliphatic or aromatic hydrocarbon type, or a ketone, ester, or alcohol, and emulsified with water using as emulsifying agents the nonionic type. The compounds have useful effects as pre-emergence herbicides at rates as low as one half pound per acre, and show growth regulatory activity when applied pre-emergence at even lower rates. The upper limit of rate will of course, be dictated primarily by cost considerations. High rates are useful for soil sterilization. Intermediate rates can be found which eliminate all vegetation except certain desirable perennial grasses.

Example 1.—2,3,6-Trichlorobenzyl Acetate 2,3,6-trichlorotoluene (prepared by the method of Brinelow, Jones and Metcalfe, J. Chem. Soc. 1951, 1208) was chlorinated at ninety to one hundred and twenty degrees centigrade under illumination by a four hundred watt mercury vapor light until a specific gravity of 1.51 (twenty degrees centigrade) was reached. The crude 2,3,6-trichlorobenzyl chloride was fractionated, taking the fraction boiling at one hundred and twenty-eight to one hundred and thirty-four degrees centigrade (7.5 mm.) as pure 2,3,6-trichlorobenzyl chloride. To a refluxing solution of three hundred and twenty-eight grams of anhydrous sodium acetate in four hundred ml. of glacial acetic acid was added, with stirring, six hundred and ninety grams of 2,3,6-trichlorobenzyl chloride. The mixture was refluxed and stirred for eight hours. Two liters of water were added, the organic layer separated and dried over magnesium sulfate, and fractionated. The fraction boiling at one hundred and fifty-four to one hundred and fifty-six degrees centigrade (8 mm.) was taken as the product; yield, five hundred and fifty-five grams. The product recrystallized from hexane melted at forty-eight degrees centigrade. The product could be saponified to the known 2,3,6-trichlorobenzyl alcohol (loc. cit.).

*Analysis.*—Calcd. for $C_9H_7Cl_3O_2$: Cl, 42.0. Found: Cl, 41.5.

Example 2.—2,3,6-Trichlorobenzyl Formate

In the manner of Example 1, 2,3,6-trichlorobenzyl chloride was reacted with sodium formate in formic acid for forty-eight hours to obtain a sixty-two precent yield of 2,3,6-trichlorobenzyl formate, melting point sixty-four to sixty-four point five degrees centigrade.

*Analysis.*—Calcd. for $C_8H_5Cl_3O_2$: Cl, 44.4. Found: Cl, 44.2.

Example 3.—2,3,6-Trichlorobenzyl N-Butyrate

In the manner of Example 1, 2,3,6-trichlorobenzyl chloride was reacted with sodium n-butyrate in n-butyric acid for eight hours to obtain a fifty percent yield of 2,3,6-trichlorobenzyl n-butyrate boiling point two hundred to two hundred and five degrees centigrade (23 mm.).

*Analysis.*—Calcd. for $C_{11}H_{11}Cl_3O_2$: Cl, 37.8. Found: Cl, 38.8.

Examples 4–13

The compounds listed on Table 1 were prepared by esterification of 2,3,6-trichlorobenzyl alcohol with the corresponding acid in the presence of toluene and a trace of p-toluenesulfonic acid as esterification catalyst. As reaction mixtures were refluxed, the water produced and entrained by the toluene was collected in a Dean-Stark trap until the theoretical amount of water had been collected. The reaction mixtures were washed with dilute sodium carbonate solution, and the organic layer dried and fractionated.

Example 14.—2,3,6-Trichlorobenzyl Hydrogen Phthalate

A solution of ten point five grams of 2,3,6-trichlorobenzyl alcohol and eight grams of phthalic anhydride in fifty grams of dry pyridine was allowed to stand at twenty to thirty degrees centigrade for one week, then evaporated to dryness, the residue taken up in benzene and dilute hydrochloric acid, and the insoluble portion removed by filtration. The solids were heated with four liters of water on the steam bath and filtered while warm to obtain fifteen grams of white crystalline solid, melting point one hundred and eighty-three point five to one hundred and eighty-four point five degrees centigrade.

*Analysis.*—Calcd. for $C_{15}H_9Cl_3O_4$: Cl, 29.6. Found: Cl, 29.1.

Example 15.—2,3,6-Trichlorobenzyl Hydrogen Succinate

A solution of ten point five grams of succinic anhydride and twenty-one grams of 2,3,6-trichlorobenzyl alcohol in one hundred ml. of dry pyridine was allowed to stand at twenty to thirty degrees centigrade for one week, then stripped free of pyridine and the residue titrated with two hundred ml. of benzene and 1000 ml. of dilute hydrochloric acid. The resultant solid was removed by filtration, and recrystallized from hot benzene to obtain twenty-six grams of crystalline solid, melting point one hundred and twenty point six to one hundred and twenty-one point six degrees centigrade.

*Analysis.*—Calcd. for $C_{11}H_9Cl_3O_4$: Cl, 33.1. Found: Cl, 33.9.

Example 16.—2,3,6-Trichlorobenzyl N-Phenylcarbamate

A mixture of ten point five grams 2,3,6-trichlorobenzyl alcohol, five point eight grams of phenyl isocyanate, and ten ml. of dry toluene were held at forty-five degrees centigrade for twenty hours, evaporated to dryness and the residual solid recrystallized from carbon tetrachloride to obtain ten point five grams of colorless solid, melting point one hundred and eight degrees centigrade.

*Analysis.*—Calcd. for $C_{14}H_{10}Cl_3O_2N$: Cl, 32.3. Found: Cl, 32.5.

Example 17.—2,3,6-Trichlorobenzyl Hydrogen Sulfate (Sodium Salt)

To five point eight grams of chlorosulfonic acid in fifty ml. dry pyridine were added ten point five grams of 2,3,6-trichlorobenzyl alcohol, the mixture heated one hour at ninety-five to one hundred degrees centigrade, evaporated under vacuum, the residue dissolved in water and five point three grams of anhydrous sodium carbonate added. The mixture was evaporated to dryness, one hundred ml. of dioxane added, and the mixture filtered. To the clear filtrate was added four hundred ml. of ether and the resultant crystalline precipitate removed by filtration and dried, yield thirteen grams of colorless crystalline solid with no sharp melting point.

*Analysis.*—Calcd. for $C_7H_4Cl_3SO_4Na$: Cl, 33.9; S, 10.2. Found: Cl, 32.8; S, 9.0.

TABLE I

| Example No. (Compound No.) | Compound | B.P. (° C.) | M. P. (° C.) | Percent Cl Calcd. | Percent Cl Found |
|---|---|---|---|---|---|
| 4 | 2,3,6-trichlorobenzyl 2-ethylhexoate | 156° C. (0.8 mm.) | Oil | 31.6 | 31.1 |
| 5 | 2,3,6-trichlorobenzyl stearate | Above 230° C. (0.1 mm.) | Waxy solid | 23.2 | 23.0 |
| 6 | 2,3,6-trichlorobenzyl naphthenate | (¹) | (¹) | | |
| 7 | 2,3,6-trichlorobenzyl chloroacetate | 150° C. (1 mm.) | 63–4 | 49.3 | 49.6 |
| 8 | 2,3,6-trichlorobenzyl trichloroacetate | 135–140° C. (0.1 mm.) | 64–5 | 59.7 | 59.3 |
| 9 | 2,3,6-trichlorobenzyl α,α-dichloropropionate | 138 (0.3 mm.) | 62–6 | 52.7 | 52.2 |
| 10 | 2,3,6-trichlorobenzyl 2,4-dichlorophenoxyacetate | Not distilled | 124.5 | 42.9 | 42.5 |
| 11 | 2,3,6-trichlorobenzyl benzoate | 169 (1 mm.) | 62 | 33.7 | 33.8 |
| 12 | 2,3,6-trichlorobenzyl (mixed) trichlorobenzoate | (¹) | (¹) | | |
| 13 | 2,3,6-trichlorobenzyl phthalate (di-) | Not distilled | 133–4 | 38.6 | 37.8 |

¹ Undistillable viscous syrup.

*Example 18.—S-2,3,6-Trichlorobenzyl Hydrogen Xanthate(Potassium Salt)*

To a solution of twenty-one grams 2,3,6-trichlorobenzyl alcohol in twenty-five ml. of 1,2-dimethoxyethane was added five point six grams of pulverized potassium hydroxide, the mixture heated one hour at ninety-five to one hundred degrees centigrade, the clear supernatant decanted, cooled, and fifty ml. of dry ether added. Then ten to eleven grams of carbon disulfide was slowly added with shaking and cooling and finally two volumes of ether was added. The solids were removed by filtration, and reprecipitated from acetone solution by addition of ether to obtain ten point five grams of pale yellow crystals.

*Analysis.*—Calcd. for $C_8H_4Cl_3OS_2K$: Cl, 32.7; S, 19.7. Found: Cl, 31.8; S, 18.5.

*Example 19.—2,3,6-Trichlorobenzyl Hydrogen Phosphite*

This compound was prepared from 2,3,6-trichlorobenzyl alcohol using the general method of Atherton (J. Chem. Soc. 1945, 384). The product was a colorless solid, melting point one hundred and thirty-one degrees centigrade.

*Analysis.*—Calcd. for $C_{14}H_9Cl_6O_3P$: Cl, 45.5. Found: Cl, 45.2.

*Example 20.—2,3,6-Trichlorobenzyl Dichlorophosphate*

A mixture of three point one grams phosphorus oxychloride thirteen grams, 2,3,6-trichlorobenzyl alcohol, four point nine grams pyridine, and one hundred ml. dry benzene was stirred twelve hours at twenty to thirty degrees centigrade, filtered, evaporated to a pyridine-free oil, one hundred ml. of benzene added, the solution washed with dilute soduim carbonate, then with water, and dried over $Na_2CO_3$. The filtered benzene solution was evaporated, leaving a colorless oil.

*Analysis.*—Calcd. for $C_7H_4Cl_5O_2P$: Cl, 54.2. Found: Cl, 54.3.

*Example 21.—2,3,6-Trichlorobenzyl N,N-Diethyldithiocarbamate*

A mixture of twenty grams of potassium N,N-diethyldithiocarbamate, twenty-three grams of 2,3,6-trichlorobenzyl chloride, and one hundred ml. of 2B ethanol were refluxed for four hours, evaporated to dryness, the residue taken up in water and benzene, the benzene layer separated, stripped free of benzene and the residual was distilled. The product was a viscous yellowish syrup, boiling point two hundred and two to two hundred and three degrees centigrade (0.3 mm.).

*Analysis.*—Calcd. for $C_{12}H_{14}Cl_3S_2N$: Cl, 31.1; N, 4.08. Found: Cl, 31.0; N, 4.0.

*Example 22.—S-2,3,6-Trichlorobenzyl Hydrogen Thiosulfate (Sodium Salt)*

A mixture of forty-seven grams of sodium thiosulfate, forty-six grams of 2,3,6-trichlorobenzyl chloride and two hundred cc. 2B denatured ethanol was refluxed and stirred for six hours. The reaction mixture was diluted with 1 liter of warm water, then cooled and the resulting crystals removed by filtration and recrystallized from aqueous ethanol to yield forty-five grams of silvery leaflets.

*Analysis.*—Calcd. for $C_7H_4Cl_3S_2O_3NaH_2O$; Cl, 30.6; S, 18.4. Found: Cl, 30.3; S, 18.6.

*Example 23.—2,3,6-Trichlorobenzyl Thiocyanate*

A mixture of eleven point four grams of ammonium thiocyanate, twenty-three grams of 2,3,6-trichlorobenzyl chloride, and one hundred ml. of 2B ethanol was refluxed and stirred for three hours, evaporated on the steam bath, and the residue taken up in warm water to dissolve the salts. The organic layer was separated and recrystallized from heptane to obtain a colorless crystalline solid, melting point fifty-two to fifty-six degrees centigrade, irritating to the skin.

*Analysis.*—Calcd. for $C_8H_4Cl_3NS$: Cl, 42.2; S, 12.7. Found: Cl, 42.1; S, 12.6.

*Example 24.—2,3,6-Trichlorobenzyl Phosphorodithioate (Technical)*

A mixture of eleven grams of 2,3,6-trichlorobenzyl alcohol, three grams phosphorus pentasulfide, and fifty ml. of benzene was refluxed for twelve hours, filtered and stipped of benzene leaving an undistillable viscous syrup.

*Analysis.*—Calcd. for $C_{14}H_9Cl_6O_2PS_2$: Cl, 41.2; S, 12.4. Found: Cl, 42.1; S, 10.6.

*Example 25.—2,3,6-Trichlorobenzyl Caprylate (Technical)*

Technical trichlorobenzyl chloride (about fifty percent 2,3,6-trichlorobenzyl chloride) was made from technical trichlorotoluene and converted to trichlorobenzyl alcohol, boiling point one hundred and fifty to one hundred and sixty-five degrees centigrade (7 mm.), by saponification with ten percent sodium hydroxide solution at reflux for four days. This alcohol was esterified by the method of examples four to thirteen with commercial caprylic acid to produce technical 2,3,6-trichlorobenzyl caprylate, boiling point one hundred and ninety to two hundred and twenty degrees centigrade (4 mm.). Infrared analysis indicated that about one-half of the composition had the 2,3,6-structure.

*Example 26.—2,3,6-Trichlorobenzyl Trichlorobenzoate (Technical)*

A mixture of two hundred and eighteen grams of technical trichlorobenzyl alcohol (prepared as in the foregoing example), two hundred grams of triethylamine and one liter of xylene was refluxed and two hundred and fifty-five grams of technical trichlorobenzoyl chloride was added slowly. After a ten-hour period of reflux, the mixture was cooled the solids removed by filtration and washed with xylene. The combined filtrate and washings were washed with dilute sodium bicarbonate solution, then with water, and finally stripped free of xylene under reduced pressure. The product remained as a viscous syrup, yield two hundred and forty-four grams.

The following examples illustrate some of the methods of formulation employed in our invention.

*Example 27*

| | Parts by weight |
|---|---|
| 2,3,6-trichlorobenzyl acetate | 10 |
| Xylene | 15 |
| Atlox 3335 (non-ionic emulsifier) | 3 |
| Atlox 8916P (non-ionic emulsifier) | 1 |
| Water (to make emulsion) | 500 |

*Example 28*

Five parts by weight of 2,3,6-trichlorobenzyl hydrogen phthalate were placed in twenty parts of water, and the equivalent quantity of triethylamine added to neutralize the acid group, forming a solution of triethylammonium salt in water.

*Example 29*

| | Parts by weight |
|---|---|
| Sodium 2,3,6-trichlorobenzyl sulfate | 10 |
| Attapulgus clay | 90 |

The constituents are blended to make a dry mixture.

*Example 30*

| | Parts by weight |
|---|---|
| Sodium 2,3,6-trichlorobenzyl | 5 |
| Ethanol | 20 |
| Water | 25 |

Example 31

Sodium S-2,3,6-trichlorobenzyl thiosulfate _____ 1
Water _____ 99

This formulation is a clear solution.

Example 32

Plots of sandy loam five feet by forty feet were plowed, disked, then sprayed with the chemicals indicated below. The plots were seeded with sweet corn, black beans, a mixture of broad-leaf weeds (lambsquarters, ragweed, pigweed, smartweed), and grasses (millet, wild oats, foxtail). The plots were inspected seven weeks lated with the results given in Table 2.

These data indicate that the compounds of the invention have growth regulatory characteristics at non-toxic levels of application.

The examples of the compositions of our invention and methods of preparing and utilizing them, which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

This is a division of our copending application S.N. 714,951, now abandoned, filed February 13, 1958.

TABLE 2

| Chemical | Rate lbs. Active Ingredient per Acre | Effect on Various Species | | | |
|---|---|---|---|---|---|
| | | Sweet Corn | Beans | Broad-leaf Weeds | Grasses |
| 2,3,6-trichlorobenzyl acetate | 3 | 0 | 5 | 5 | 1 |
| 2,3,6-trichlorobenzyl dichloroacetate | 3 | 0 | 5 | 4 | 2 |
| 2,3,6-trichlorobenzyl trichloroacetate | 3 | 3-4 | 5 | 5 | 3 |
| 2,3,6-trichlorobenzyl trichloroacetate | 0.4 | 0 | 2-3 | 2-3 | 0 |
| 2,3,6-trichlorobenzyl trichlorobenzoate | 3 | 0 | 5 | 5 | 2-3 |
| 2,3,6-trichlorobenzyl trichlorobenzoate | 0.4 | 0 | 3 | 1 | 0 |
| 2,3,6-trichlorobenzyl chloride | 3 | 0 | 2 | 1 | 0 |
| 2,3,6-trichlorobenzyl n-butyrate | 3 | *0 | 5 | 5 | 1 |
| 2,3,6-trichlorobenzyl n-butyrate | 1 | *0 | 3-4 | 3-4 | 0-1 |
| 2,3,6-trichlorobenzyl n-butyrate | 0-5 | *0 | 3 | 3 | 0-1 |
| 2,3,6-trichlorobenzyl napthenate | 3 | 0 | 4 | 4 | 0 |
| 2,3,6-trichlorobenzyl napthenate | 1 | 0 | 2 | 2 | 0 |
| 2,3,6-trichlorobenzyl napthenate | 0.5 | 0 | 1 | 1 | 0 |
| 2,3,6-trichlorobenzyl benzoate | 3 | *0 | 5 | 5 | 0 |
| 2,3,6-trichlorobenzyl benzoate | 1 | 0 | 4-5 | 4-5 | 1-2 |
| 2,3,6-trichlorobenzyl benzoate | 0.5 | 0 | 3-4 | 3-4 | 0 |
| 2,3,6-trichlorobenzyl trichlorobenzoate | 3 | *0 | 5 | 5 | 3 |
| 2,3,6-trichlorobenzyl trichlorobenzoate | 1 | *0 | 5 | 5 | 1-2 |
| 2,3,6-trichlorobenzyl trichlorobenzoate | 0.5 | 0 | 3-4 | 3-4 | 1 |
| 2,3,6-trichlorobenzyl sulfate (sodium) | 3 | *0 | 5 | 5 | 3-4 |
| 2,3,6-trichlorobenzyl sulfate (sodium) | 1 | *0 | 5 | 5 | 1-3 |
| 2,3,6-trichlorobenzyl sulfate (sodium) | 0.5 | *0 | 4-5 | 4-5 | 1-2 |
| 2,3,6-trichlorobenzyl thiocyanate | 3 | 0 | 5 | 3 | 0 |
| 2,3,6-trichlorobenzyl thiocyanate | 1 | 0 | 2 | 2 | 0 |
| 2,3,6-trichlorobenzyl thiocyanate | 0.5 | 0 | 1 | 1 | 0 |
| 2,3,6-trichlorobenzyl hydrogen phthalate | 3 | 0-1 | 5 | 5 | 5 |
| 2,3,6-trichlorobenzyl hydrogen phthalate | 1 | 0-1 | 5 | 5 | 4 |
| 2,3,6-trichlorobenzyl hydrogen phthalate | 0.5 | 0 | 2 | 2 | 1-2 |

*Corn aided by weed control.

KEY:
0=no effect noted.
1=slight control.
2-4=increasing degrees of control.
5=complete control (no plants surviving).

Example 33

Post-emergence tests at growth regulatory rates were carried out by spraying the compounds listed below at 0.4 lb./acre in the form of xylene emulsions in water onto month-old soybeans, black beans, millet, and a mixed stand of broad-leaf weeds (principally lambsquarters, ragweed, and pigweed). The appearance of the plants when observed one week later is indicated in Table 3.

Also shown is a comparison of compounds of this invention with 2,3,6-trichlorobenzoic acid.

We claim:
2,3,6-trichlorobenzyl 2,4-dichlorophenoxyacetate.

References Cited in the file of this patent

UNITED STATES PATENTS

| | | |
|---|---|---|
| 2,322,760 | Lontz | June 29, 1943 |
| 2,396,513 | Jones | Mar. 12, 1946 |
| 2,668,104 | Eastman | Feb. 2, 1954 |
| 2,754,188 | Yowell et al. | July 10, 1956 |
| 2,765,224 | Lambrech | Oct. 2, 1956 |
| 2,861,096 | Pumpelly | Nov. 18, 1958 |

TABLE 3

| Chemical | Corn | Soybeans | Black Beans | Millet | Broadleaf Weeds |
|---|---|---|---|---|---|
| 2,3,6-trichlorobenzyl acetate | No effect | *Acceleration | *Acceleration | No effect | Mild stunting. |
| 2,3,6-trichlorobenzyl chloroacetate | do | Mild stunting | Mild stunting | do | Do. |
| 2,3,6-trichlorobenzyl trichloroacetate | do | do | do | do | Do. |
| 2,3,6-trichlorobenzyl trichlorobenzoate | do | *Acceleration | Acceleration | do | Do. |
| 2,3,6-trichlorobenzoic acid | Foliar damage serious. | Foliar damage serious. | Foliar damage serious. | Foliar damage serious. | Foliar damage serious. |

*Of terminal growth.

UNITED STATES PATENT OFFICE
CERTIFICATE OF CORRECTION

Patent No. 3,158,645　　　　　　　　　　　　　November 24, 1964

Jack S. Newcomer et al.

It is hereby certified that error appears in the above numbered patent requiring correction and that the said Letters Patent should read as corrected below.

Column 5, line 24, for "Cl, 45.5" read -- Cl, 45.4 --; line 34, for "soduim" read -- sodium --; line 64, the formula should appear as shown below instead of as in the patent:

$$C_7H_4Cl_3S_2O_3Na \cdot H_2O$$

column 6, line 12, for "stipped" read -- stripped --; column 7, line 12, for "lated" read -- later --; columns 7 and 8, TABLE 2, first column, line 3 thereof, for "trichlorobanzyl" read -- trichlorobenzyl --.

Signed and sealed this 22nd day of June 1965.

(SEAL)
Attest:

ERNEST W. SWIDER　　　　　　　　　　　　EDWARD J. BRENNER
Attesting Officer　　　　　　　　　　　　Commissioner of Patents